US009781656B2

(12) United States Patent
    Sridhar

(10) Patent No.: US 9,781,656 B2
(45) Date of Patent: Oct. 3, 2017

(54) METHOD AND APPARATUS FOR MODIFYING CALL ADMISSION CONTROL THRESHOLDS

(75) Inventor: Kamakshi Sridhar, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1331 days.

(21) Appl. No.: 13/218,523

(22) Filed: Aug. 26, 2011

(65) Prior Publication Data

US 2013/0051332 A1    Feb. 28, 2013

(51) Int. Cl.
    H04W 4/00     (2009.01)
    H04W 48/06    (2009.01)
    H04W 24/08    (2009.01)
    H04W 76/02    (2009.01)
    H04W 84/04    (2009.01)
    H04W 92/04    (2009.01)

(52) U.S. Cl.
    CPC ............ H04W 48/06 (2013.01); H04W 24/08 (2013.01); H04W 76/02 (2013.01); H04W 84/045 (2013.01); H04W 92/045 (2013.01)

(58) Field of Classification Search
    USPC .................. 370/329, 338, 230, 230.1, 236.1; 455/439, 436, 442, 434, 352.2
    See application file for complete search history.

(56) References Cited

U.S. PATENT DOCUMENTS

| | | | |
|---|---|---|---|
| 2004/0152422 A1* | 8/2004 | Hoglund et al. ........... | 455/67.11 |
| 2006/0250953 A1 | 11/2006 | Mooney ........................ | 370/229 |
| 2007/0177510 A1* | 8/2007 | Natarajan et al. ............ | 370/238 |
| 2007/0264986 A1* | 11/2007 | Warrillow et al. ........ | 455/414.3 |
| 2008/0130495 A1* | 6/2008 | Dos Remedios et al. .... | 370/230 |
| 2008/0212482 A1* | 9/2008 | Nakayma et al. ............ | 370/237 |
| 2008/0248807 A1* | 10/2008 | Kim et al. .................... | 455/453 |
| 2009/0016278 A1* | 1/2009 | Wakabayashi ................ | 370/329 |
| 2010/0157825 A1* | 6/2010 | Anderlind et al. ........... | 370/252 |
| 2012/0294179 A1* | 11/2012 | Tafreshi ....................... | 370/252 |

FOREIGN PATENT DOCUMENTS

GB    2 454 872 A    5/2009

OTHER PUBLICATIONS

International Search Report PCT/US2012/051366 dated Nov. 11, 2012.
Written Opinion dated Nov. 11, 2012.

* cited by examiner

Primary Examiner — Zewdu A Beyen
(74) Attorney, Agent, or Firm — Davidson Sheehan LLP

(57) ABSTRACT

Embodiments of the claimed subject matter provide a method and apparatus for modifying call admission control thresholds. One embodiment of a method includes modifying one or more call admission control thresholds provided to base stations by a radio access network in response to a mismatch between a wireless access capacity of the base stations and a backhaul capacity between the base stations and the radio access network.

31 Claims, 4 Drawing Sheets

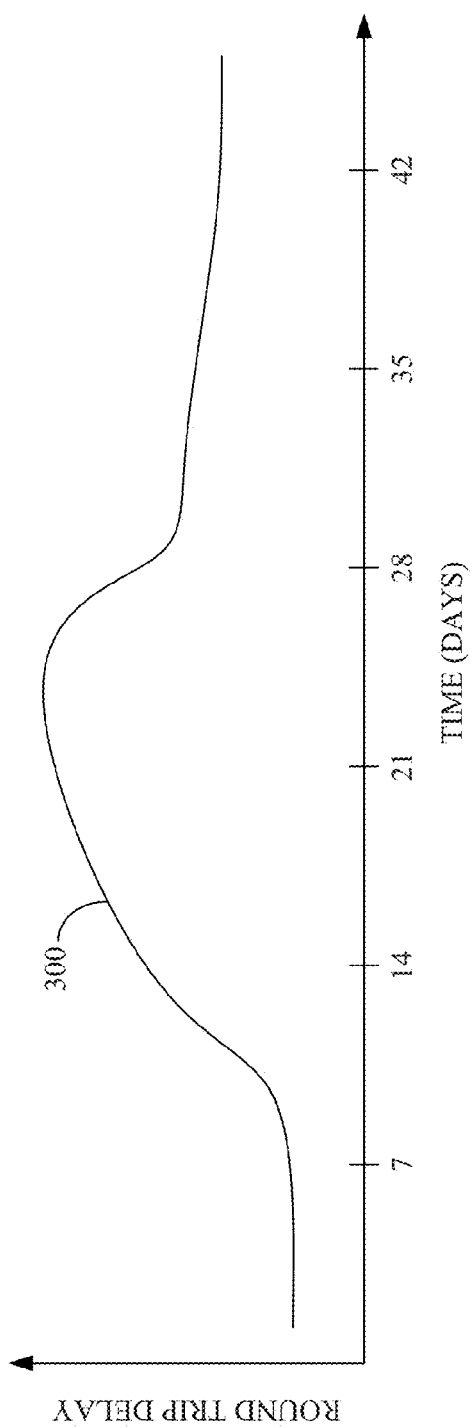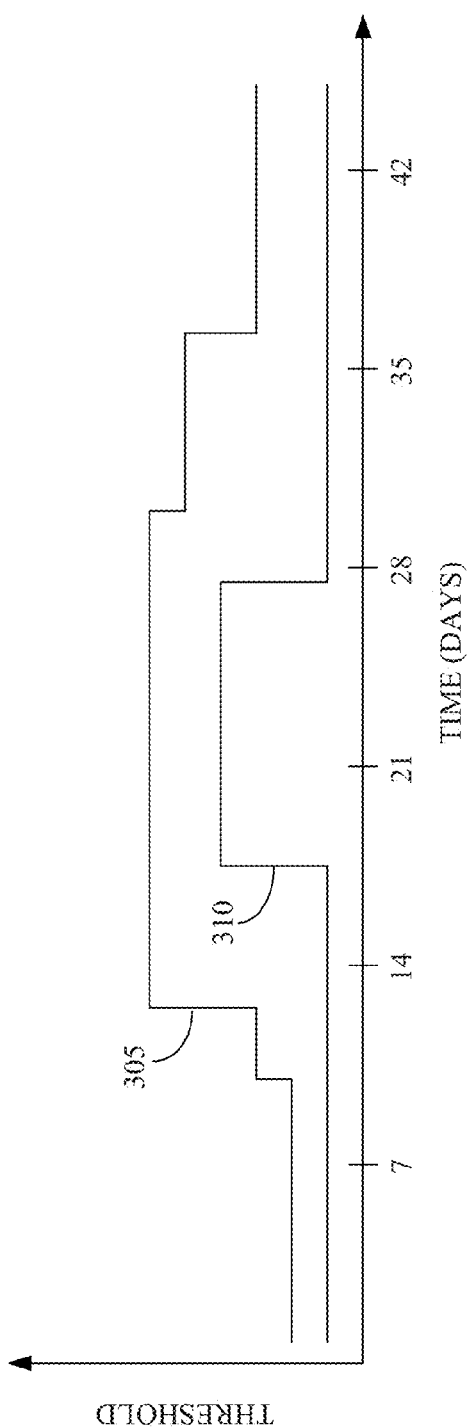

METHOD AND APPARATUS FOR MODIFYING CALL ADMISSION CONTROL THRESHOLDS

BACKGROUND

This invention relates generally to communication systems, and, more particularly, to wireless communication systems.

Wireless communication systems typically deploy numerous base stations (or other types of wireless access points such as eNodeBs) for providing wireless connectivity to mobile units (or other types of user equipment). Each base station is responsible for providing wireless connectivity to the mobile units located in a particular cell or sector served by the base station. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a small cell such as a metro cell, a micro-cell, a femtocell, or a picocell that encompasses a residence. However, the functionality in a home base station router is typically quite similar to the functionality implemented in a conventional base station router that is intended to provide wireless connectivity to a macro-cell that may cover an area of approximately a few square kilometers. One important difference between a home base station router and a conventional base station router is that home base station routers are designed to be plug-and-play devices that can be purchased off-the-shelf and easily installed by a lay person. Deployment of home base station routers may result in a very large number of femtocells, which may overlap with or be encompassed by one or more macro-cells.

Macrocells and smaller cells typically share a backhaul link to a radio access network in the wireless communication system. One responsibility of the radio access network is to transmit call admission control thresholds to the cells in a distributed network and/or to the radio network controller in a hierarchical network, e.g., when the cells are booted up. The cell uses the call admission control threshold to determine whether or not to admit the requested call. Different call admission control thresholds may be applied to relatively high priority users, such as guaranteed bit rate users, and relatively low priority users such as best effort users.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for modifying call admission control thresholds. One embodiment of the method includes modifying one or more call admission control thresholds provided to base stations by a radio access network in response to a mismatch between a wireless access capacity of the base stations and a backhaul capacity between the base stations and the radio access network.

In another embodiment, a server is provided for modifying call admission control thresholds. One embodiment of the server is configured to modify one or more call admission control thresholds provided to base stations in response to a mismatch between a wireless access capacity of the base stations and a backhaul capacity between the base stations and a radio access network. This embodiment of the server is also configured to provide the modified call admission control threshold(s) to the radio access network.

In yet another embodiment, a network gateway is provided for supporting modified call admission control thresholds. One embodiment of the network gateway is configured to monitor one or more parameters indicative of relative values of a wireless access capacity of base stations associated with a radio access network and a backhaul capacity between the base stations and the radio access network. This embodiment of the network gateway is also configured to notify a server in response to detecting a mismatch between the wireless access capacity and the backhaul capacity.

BRIEF DESCRIPTION OF THE DRAWINGS

The disclosed subject matter may be understood by reference to the following description taken in conjunction with the accompanying drawings, in which like reference numerals identify like elements, and in which:

FIG. 3A conceptually illustrates measured values of the round-trip delay for packets traveling over a backhaul link between a radio access network and one or more base stations;

FIG. 3B conceptually illustrates call admission control threshold values that correspond to the measured values of the round-trip delays.

Figure 1:
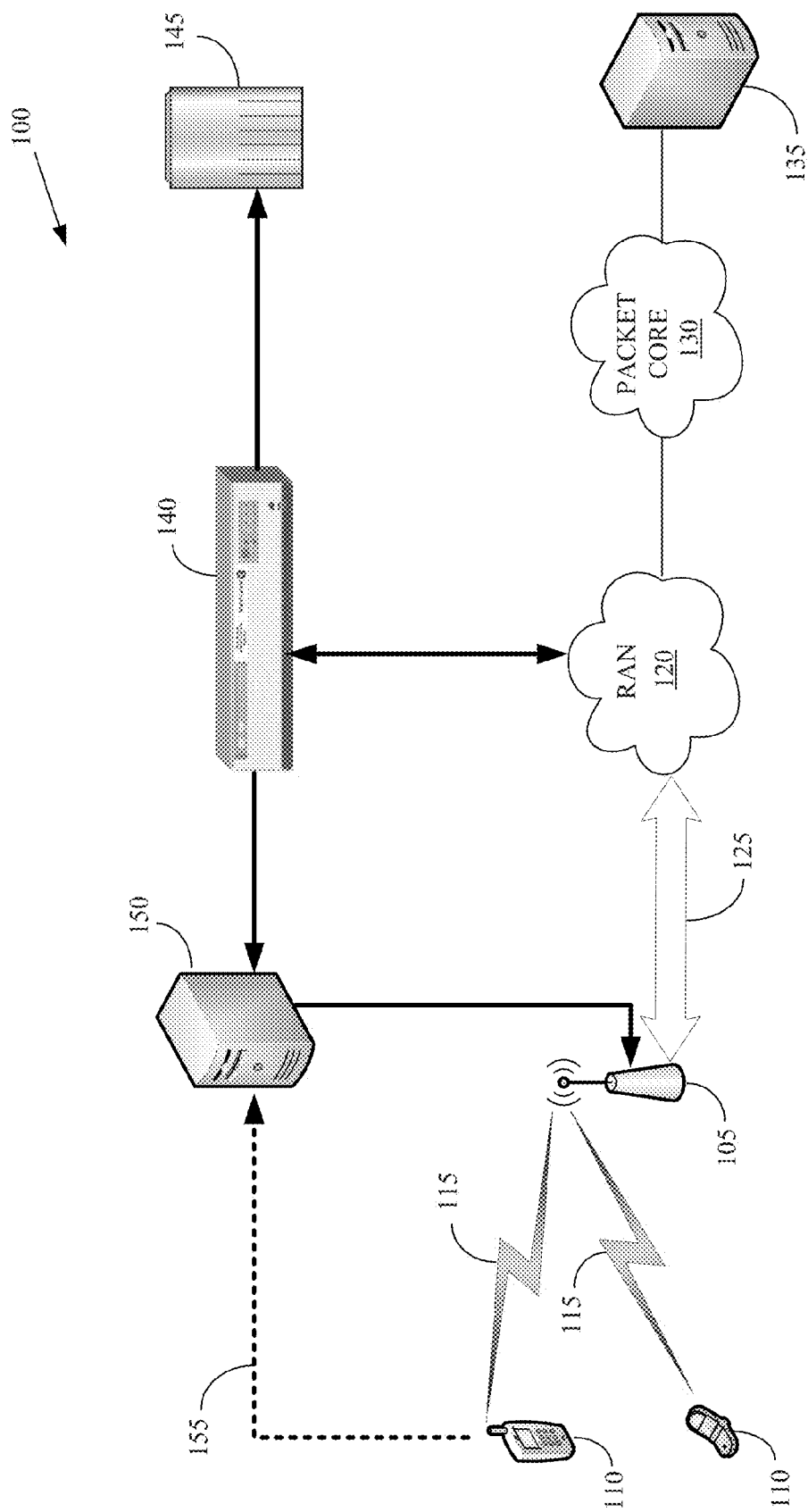
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for modifying call admission control thresholds that base stations use to decide whether to admit new calls or flows. The call admission control parameters used by base stations to decide whether to admit calls are conventionally predetermined based on engineering judgment, observations of prior network performance, and estimated capacities of a radio access network and the backhaul network at the time of deployment. For example, the thresholds for deployed base stations may be set so they correspond to (or match) the backhaul capacity of the radio access network. However, the backhaul capacity and/or congestion levels for a backhaul link or backhaul network between the base stations and the radio access network can change over time. For example, adding additional base stations, including small cells such as metro cells, microcells, femtocells, or picocells, increases the traffic flowing over the backhaul link and/or backhaul network and may consequently reduce the capacity available to base stations that were previously deployed. If the thresholds were initially determined to ensure maximum utilization of the radio access network capacity for the initial deployment, the mismatch between the backhaul capacity and the total radio capacity may lead to degradation in the quality of service (QoS) or quality of experience (QoE) for existing and/or newly admitted flows. Alternatively, if the thresholds were initially set conservatively to allow for possible increases in the number of deployed cells, the radio access network capacity may frequently be underutilized.

The present application describes embodiments of techniques that may address these drawbacks in the conventional practice by allowing call admission control thresholds to be dynamically modified. In one embodiment, the call admission control thresholds used by base stations associated with a radio access network may be modified in response to detecting a mismatch between a backhaul capacity between the base stations and the radio access network and a wireless access capacity of the deployed base stations. For example, a network gateway may monitor the end-to-end packet delay and/or packet loss rates over a time window and modify the call admission control parameters when the end-to-end packet delay and/or the packet loss rate exceed a threshold. The call admission control parameters can be adjusted to admit fewer requested calls when an increase in the end-to-end delay and/or the packet loss rate indicates congestion in the backhaul network, which may be caused by adding base stations to the network deployment during the time window.

FIG. 1 conceptually illustrates a first exemplary embodiment of a wireless communication system 100. In the illustrated embodiment, the wireless communication system 100 includes one or more base stations 105 that provide wireless connectivity to wireless-enabled devices such as user equipment 110 over air interfaces 115. The base station 105 operates according to one or more cellular standards and/or protocols and may be referred to as a macrocellular base station. For example, the base station 105 may operate according to the Long Term Evolution (LTE) of the standards and/or protocols defined by the Third Generation Partnership Project (3GPP). However, persons of ordinary skill in the art having benefit of the present disclosure should appreciate that in alternative embodiments the base station 105 may operate according to other standards and/or protocols such as code division multiple access (CDMA, W CDMA) and the like. Moreover, one or more base stations in the wireless communication system 100 may be small cells such as metro cells, microcells, femtocells, and/or picocells that operate according to other standards and/or protocols such as the WiMAX standards and/or protocols. In one embodiment, macrocells and small cells may be deployed in an overlay configuration in the wireless communication system 100.

The base station 105 communicates with a radio access network 120 over a backhaul link 125. In various embodiments, the backhaul link 125 may be part of a backhaul network that communicatively connects the base station 105 and other base stations to the radio access network 120. The backhaul network may therefore include wired and/or wireless connections as well as switches, routers, hubs, and the like for supporting uplink and downlink communication over the backhaul. The backhaul link 125 has a backhaul capacity, e.g., a capacity that may be measured in terms of a number of uplink and/or downlink bits per second that can be transmitted over the backhaul link 125. The backhaul capacity may be determined by factors such as the structure of the backhaul link 125 (or network), the devices and/or connections included in the backhaul link 125, the capacity of the radio access network 120, and the like. The total backhaul capacity may be shared among the base station 105 and any other base stations that are connected to the radio access network 120 using the backhaul link 125 or other links in the backhaul network.

In the illustrated embodiment, the radio access network 120 is communicatively coupled to a packet core network 130, which may in turn be communicatively coupled to one or more servers 135 and/or end-user devices. The radio access network 120 may also be communicatively coupled to a gateway 140 such as a wireless network gateway that can be used to support traffic management functions. For example, the gateway 140 may be used to determine packet delays and/or packet loss rates for packets transmitted over the air interfaces 115 and/or backhaul links 125, as discussed herein. The gateway 140 may also be connected to a dynamic services controller 145 that may support functionality such as a policy and charging rules function. The gateway 140 may also be communicatively coupled to a server 150. In the illustrated embodiment, the server 150 is a self-optimizing network (SON) server that may be configured to support operations, administration, and maintenance (OAM) functions. The server 150 may also receive measurement feedback from user equipment 110, as indicated by the dashed arrow 155.

The embodiment of the server 150 shown in FIG. 1 is configured to generate, modify, and/or store call admission control parameters or thresholds. The server 150 is also configured to provide call admission control parameters or thresholds to the base stations 105. Exemplary call admission control thresholds used by base stations or eNBs such as the base station 105 may include the number of user equipment (UEs) served by (or "on") the base station 105, the number of UEs on the cell, the number of bearers on the base station 105 for either guaranteed bit rate (GBR) users and/or non-GBR users such as best effort users, the number of bearers on the cell (GBR or non-GBR), the number of bearers per group of quality of service class indicators (QCI) on the cell, the downlink/uplink (DL/UL) usage of physical resource blocks (PRBs) on the cell, the DL/UL PRBs usage on the base station 105 when PRB pooling between cells is activated, and the like.

The total wireless access capacity supported by the base station 105 and any other base stations that may share the backhaul link 125 may be determined in part by the maximum capacity that can be supported by each of the base stations 105. The total capacity can be expressed in terms of a number of bits per second that can be supported for communication over the air interfaces 115, a number of guaranteed bit rate users, a number of non-guaranteed or best effort users, and the like. In some embodiments, the total wireless access capacity may also be determined in part by call admission control thresholds provided to the base stations 105, e.g., by the server 150. For example, setting the call admission control thresholds to a relatively low value can increase the probability that new calls or flows may be admitted by the base station 105, thereby increasing the wireless access capacity supported by the base station 105. For another example, setting the call admission control thresholds to a relatively high value can decrease the probability that new calls or flows of the admitted by the base station 105, thereby decreasing the wireless access capacity supported by the base station 105. Although the embodiments described herein assume that decreasing the call admission control thresholds can increase the probability that calls or flows are admitted by the base station 105 (and vice versa), persons of ordinary skill in the art having benefit of the present disclosure should appreciate that in alternative embodiments that use different definitions of call admission control thresholds increasing the call admission control thresholds may increase the probability that calls or flows are admitted by the base station 105 (and vice versa), The wireless communication resources may be matched to the backhaul resources provided by the backhaul link 125 and the radio access network 120. In one embodiment, the server 150 can modify call admission control thresholds when a mismatch is detected between the wireless access capacity of the base stations 105 and the backhaul capacity of the link 125. For example, the backhaul link 125 may become a bottleneck or chokepoint for packets if the wireless access capacity of the base stations 105 exceeds the backhaul capacity. The quality of service experienced by new and/or existing users such as guaranteed bit rate users may therefore deteriorate if the base station 105 continues to admit new calls. The server may therefore modify the call admission control thresholds and provide the modified call admission control thresholds to the base stations 105. By implementing the modified call admission control thresholds, the base stations 105 may reduce the probability that they admit new calls, thereby reducing the mismatch between the wireless access capacity and the backhaul capacity. In one embodiment, the call admission control thresholds may also be reduced when the backhaul capacity exceeds the wireless access capacity.

Figure 2:
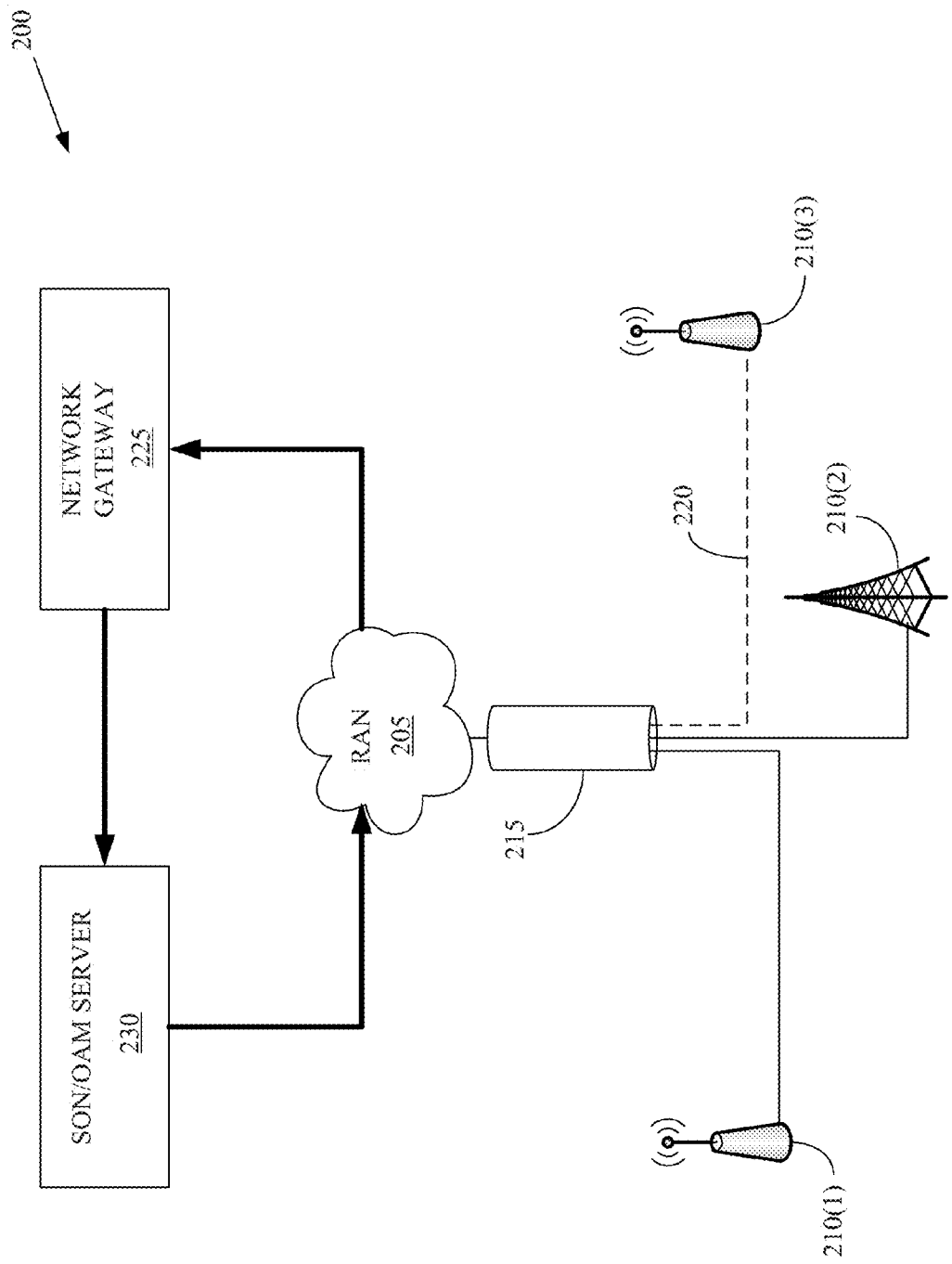
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes a radio access network 205 that communicates with base stations 210 over a backhaul 215. The base stations 210 may be macrocellular base stations 210(2) that operate according to cellular standards and/or protocols or small cell base stations 210(1, 3) such as metro cells, microcells, femtocells, picocells, and the like. In some embodiments, the base stations 210 may be deployed in an overlay configuration. The initial deployment of the base stations 210 includes the base stations 210(1-2), which share the backhaul 215 to the radio access network 205. In the illustrated embodiment, the base station 210(3) is not a part of the initial deployment, as indicated by the dashed line 220. The wireless access capacity of the base stations 210 is therefore determined by the wireless access capacity of the base stations 210(1-2) and does not include any wireless access capacity associated with the base station 210(3).

Call admission control thresholds used by the base stations 210 are initially set based upon the wireless access capacity of the base stations 210(1-2) and the backhaul capacity of the backhaul 215. In the illustrated embodiment, the call admission control thresholds are set to maximize utilization of the backhaul 215 and the radio access network 205 and so the call admission thresholds are set so that the wireless access capacity approximately matches the backhaul capacity. However, in alternative embodiments, the call admission control thresholds maybe set conservatively so that the wireless access capacity of the base stations 210(1-2) is less than the backhaul capacity of the backhaul 215.

Subsequent to the initial deployment of the base stations 210(1-2), one or more additional base stations 210(3) are deployed in the wireless communication system 200. In the illustrated embodiment, the newly deployed base station 210(3) shares the backhaul 215 to the radio access network 205. The wireless access capacity of the base stations 210(1-3) may therefore exceed the capacity of the backhaul 215, which may cause congestion in the backhaul traffic associated with the base stations 210 depending upon the loading of the different base stations 210. The congestion may in turn cause an increase in one or more packet delays and/or an increase in the packet loss rate for packets conveyed over the backhaul 215.

A network gateway 225 may receive packet information from the radio access network 205 that is associated with packets conveyed over the backhaul 215. In one embodiment, the packet information includes a 5-tuple that indicates a source address, a destination address, a source port, a destination port, and a type of application for each packet. The network gateway 225 may use this information, perhaps in combination with a timestamp associated with the packet, to measure packet delays and/or packet loss rates. For example, the network gateway 225 may use the packet information to determine an end-to-end packet delay that includes air interface delays and backhaul delays. For another example, the network gateway 225 may use the information to estimate the end-to-end packet delay and the air interface delay, which may allow the network gateway 225 to calculate packet delays that occur in the backhaul 215. However, persons of ordinary skill in the art having benefit of the present disclosure should appreciate that other techniques may be used to estimate packet delays and/or packet loss rates. For example, the network gateway 225 may use a ping function to generate packets for transmission to one or more of the base stations 210, which may return a response packet that can be used to estimate packet loss rates and/or packet delays.

The network gateway 225 may determine whether or not the packet delays and/or the packet loss rates exceed a first threshold that indicates congestion in the backhaul link 215. In one embodiment, the network gateway 225 monitors packet loss rates and/or packet delays over a time window and computes average values of these parameters, e.g. using statistical averaging techniques such as an exponentially weighted moving average (EWMA) of the packet delays and/or packet loss rates over the time window. The network gateway 225 may then notify a server 230 when the packet delays and/or packet loss rates exceed the first threshold. For example, the network gateway 225 may notify a SON/OAM server 230.

The server 230 can modify the call admission control thresholds used by the base stations 210 to attempt to reduce the backhaul congestion that may be leading to measured packet delays and/or packet loss rates. In one embodiment, the server 230 may increase the call admission control thresholds and then transmit the modified thresholds to the radio access network 205 for transmission to the base stations 210. Increasing the call admission control thresholds may reduce the probability that the base stations 210 admit new calls or flows, which may therefore reduce the overall wireless access capacity of the base stations 210. For example, the server 230 may increase the call admission control thresholds until the wireless access capacity of the base stations 210 matches the backhaul capacity of the backhaul 215. A match between these capacities may be indicated when the packet delays and/or packet loss rates determined by the network gateway 225 drop below a second threshold, which may be the same as the first threshold used to determine the mismatch or which may be set lower than the first threshold in order to provide a hysteresis.

Removing one or more of the base stations 210 may also lead to a mismatch in which the wireless access capacity of the base stations 210 falls below the backhaul capacity of the backhaul 215. In one embodiment, the network gateway 225 may detect this mismatch when the packet delays and/or packet loss rates fall below a third threshold and may then send a signal indicating this mismatch to the server 230. The resources of the radio access network 205 may be underutilized in this case. The server 230 may decrease the call admission control thresholds to increase the probability that the base stations 210 admit new calls or flows, thereby increasing the wireless access capacity. The call admission control thresholds may be increased until the wireless access capacity matches the backhaul capacity, which may be indicated by the packet delays and/or packet loss rates rising above a fourth threshold. The fourth threshold may be the same as the third threshold or may be set to a value that is higher than the third threshold to provide a hysteresis.

FIG. 3A conceptually illustrates measured values of the round-trip delay 300 for packets traveling over a backhaul link between a radio access network and one or more base stations. FIG. 3B conceptually illustrates call admission control threshold values 305, 310 that correspond to the measured values of the round-trip delays. However, persons of ordinary skill in the art having benefit of the present disclosure should appreciate that other embodiments may use other network performance-related parameters, such as packet loss rates and backhaul link delays, instead of or in combination with the measured values of the round-trip delays. The vertical axes in these two figures have arbitrary units and the horizontal axis indicates time in days. The two figures are aligned in time to illustrate the relationship between the round-trip delay 300 and the call admission control threshold values 305, 310. In the illustrated embodiment, the call admission control threshold value 305 indicates a value that is used by non-guaranteed bit rate or best effort users and the call admission control threshold value 310 indicates a value that is used by guaranteed bit rate users.

The round-trip delays 300 are determined using information associated with individual packets that are exchanged over the backhaul between the radio access network and associated base stations, as discussed herein. Thus, the curve indicating the round-trip delays 300 is substantially continuous because the measurements are performed in real-time or near real-time and the time between the measurements of the packet-related parameters may be as small as a few milliseconds or less. However, in the illustrated embodiment, the frequency of updates to the call admission control parameters and/or threshold is performed on longer timescales. For example, the network can decide whether to update the call admission control parameters on longer timescales so that the updates do not interfere with inner loop dynamics of the scheduling algorithms implemented in the base stations. The timescales for updating call admission control parameters may also be selected based on an expected frequency of changes in the network appointments, e.g., due to the addition or removal of small cell base stations, so that the updates are responsive to the changes in the deployment. For example, call admission control parameters may be updated on timescales of several hours to a few days.

In the illustrated embodiment, a network entity such as an OAM server decides whether to update the call admission control thresholds approximately once per day. The server may use an average value of the round-trip delay 300 for packets conveyed over the backhaul during the previous day to decide whether to update the threshold. For example, the server may compare an EWMA of the measured round-trip delays 300 to a threshold value of the EWMA and may increase or decrease the call admission control thresholds depending on whether the EWMA increases or decreases, e.g., whether the EWMA rises above or falls below its corresponding threshold. In the illustrated embodiment, the best effort call admission control threshold 305 is initially set to a higher level than the guaranteed bit rate threshold 310 so that calls or flows for the guaranteed bit rate users are preferentially admitted. After day 7, the round-trip delays begin to increase and so the server increases the best effort thresholds 305 to reduce the probability that best effort users are admitted. The round-trip delay 300 continues to increase from day 14 to day 28 and so the server may also increase the call admission control thresholds 310 for the guaranteed bit rate users to reduce the probability that new calls or flows from guaranteed bit rate users are admitted. As the round-trip delay begins to decrease after day 28, the thresholds 305, 310 may also be decreased to allow the system to admit more new best effort and/or guaranteed bit rate calls.

Figure 4:
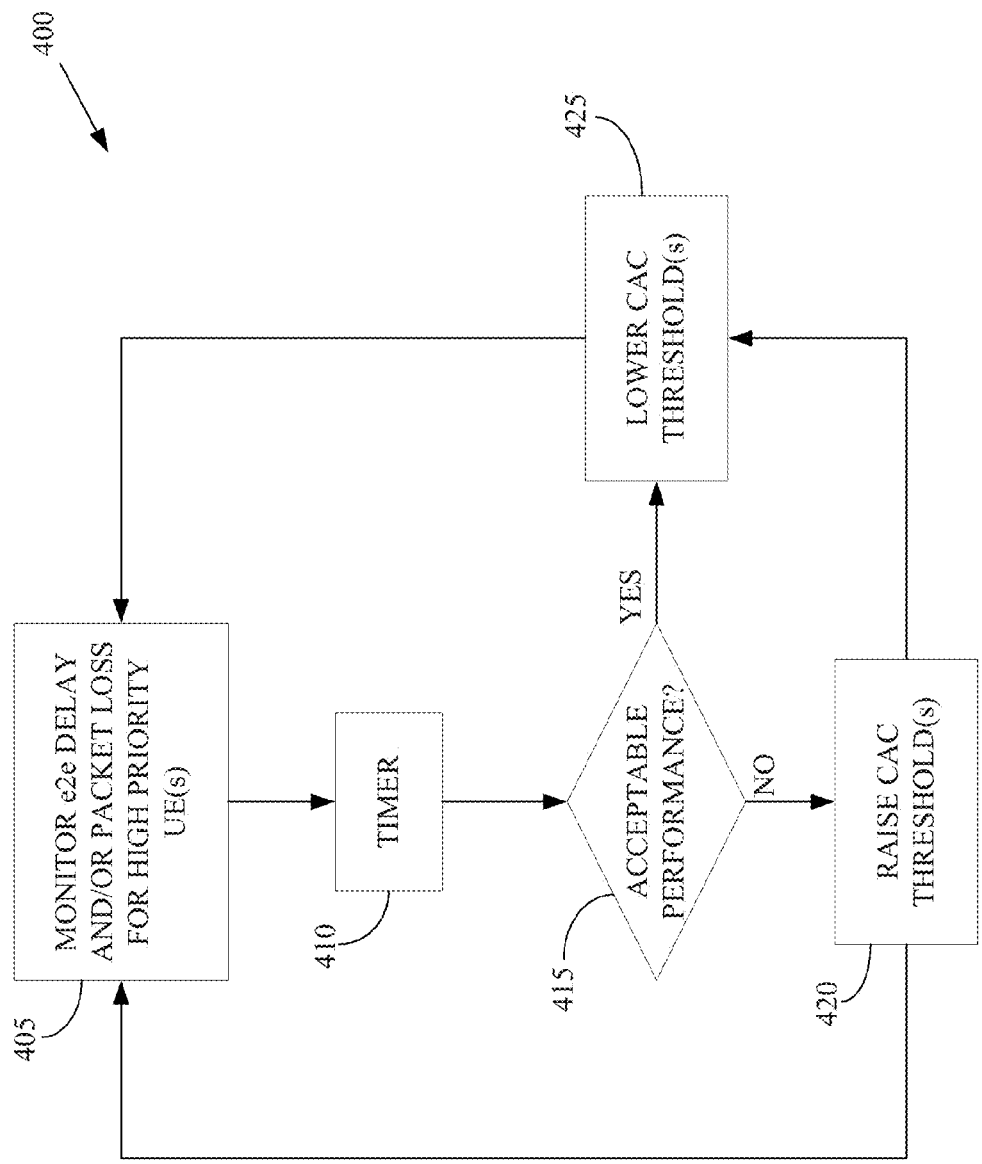
FIG. 4 conceptually illustrates one exemplary embodiment of a method or modifying call admission control thresholds.

FIG. 4 conceptually illustrates one exemplary embodiment of a method 400 or modifying call admission control thresholds. In the illustrated embodiment, performance metrics such as packet delays and/or packet loss rates are monitored (at 405). For example, a network gateway can substantially continuously monitor (at 405) the end-to-end (e2e) delays and/or packet loss rates for high-priority user equipment such as user equipment that are allocated guaranteed bit rates. The delays and/or packet loss rates can be determined using packet timestamps, 5-tuples, ping techniques, and the like. Measurements of the monitored parameters can be accumulated for a time indicated by a timer (at 410). In one embodiment, a statistical combination such as a mean, a median, a mode, or a weighted average of the measurement values may be formed using the accumulated measurements.

The gateway can then use the metrics to determine (at 415) whether the performance of the backhaul is acceptable using the current call admission control threshold. When the performance metrics exceed (at 415) a certain internal threshold set or maintained within the gateway, the gateway may inform a server such as an OAM server by transmitting a feedback message indicating that the system performance has degraded. The OAM server interprets this feedback from the gateway as an indication that the performance of guaranteed bit rate and/or other high priority users is not being met. In one embodiment, the server may first check to see whether the configuration parameters have been set correctly. If not, the server may transmit the correct call admission control thresholds to the radio access network and/or base stations. If the correct parameters are being used, the server may raise (at 420) the CAC thresholds for high-priority users to prevent new calls or flows from being admitted to the radio access network. Existing flows may be left as such and the radio access network may do its best to meet their performance guarantees without being burdened with new incoming flows that would make it more difficult for the radio access network scheduler to meet the requirements imposed by the performance guarantees. Therefore, the performance of existing flows should not degrade and the performance of new flows admitted to the network should not suffer. Existing service-level agreements should also be honored. Eventually, enough existing flows should be dropped, e.g., due to the calls being completed, so that new flows can be admitted to the network.

In the illustrated embodiment, the gateway continues to monitor (at 405) the network performance. When it determines (at 415) that the delay and/or packet loss requirements for existing guaranteed bit rate traffic are continuously being met for extended periods of time, the gateway may send a feedback message to the OAM/SON server to indicate that performance of the system is acceptable. The SON server may then decide to lower (at 425) call admission control thresholds to admit more users into the network to better utilize the capacity of the backhaul and/or the radio access network.

After some time, operation of the method 400 may lead to stable network operation using the modified call admission control thresholds as long as the network deployment remains the same. Changing the network deployment, e.g., by adding or removing cells or by adding or removing backhaul capacity may alter the equilibrium and lead to further modifications of the call admission control thresholds. Since the gateway is continuously monitoring (at 405) the quality of experience (QoE) of the bearer traffic, the gateway can continuously provide feedback information to the SON server/OAM to fine tune the values of the CAC thresholds. The method 400 may therefore be a substantially continuous and/or ongoing process that supports self-corrective action as the network load (both GBR and non-GBR traffic) and the type of network traffic changes.

Embodiments of the techniques for modifying the call admission control thresholds described herein may have a number of advantages over the conventional practice. Feedback from the gateway that is monitoring the UE packet flows may allow for the LTE and WCDMA radio access network call admission control thresholds to be set to maximally utilize the radio access network capacity while also satisfying the QoE of GBR users across the radio access network and packet core network on an e2e basis. Embodiments of the call admission control threshold modification technique described herein may also support a dynamic network where user QoE is best met while optimizing the available network resources under varying load conditions. Existing solutions do not allow for near-real-time simultaneous optimization of air interface resources and the core network for UE flows. As a result, RAN capacity may be underutilized. Furthermore, even when the radio access network capacity is well utilized, the overall e2e flow performance as measured by delay and packet loss may be sub-optimal. In contrast, embodiments of the techniques described herein allow the network to sense the delay and packet loss on an e2e basis at the application layer for UE flows so that the network can optimize RAN and core capacity.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    modifying at least one call admission control threshold provided to a plurality of base stations in response to a mismatch between a combined wireless access capacity of the plurality of base stations and a backhaul capacity of a backhaul connection shared by the plurality of base stations.

2. The method of claim 1, wherein modifying said at least one call admission control threshold comprises modifying at least one of a first call admission control threshold used to determine whether to admit guaranteed bit rate users or a second call admission control threshold used to determine whether to admit best effort users.

3. The method of claim 1, comprising monitoring at least one of a packet delay or a packet loss rate for packets conveyed over the backhaul connection and wherein the mismatch between the combined wireless access capacity and the backhaul capacity is indicated by at least one of the packet delay or the packet loss rate exceeding a first threshold.

4. The method of claim 3, wherein monitoring the packet delay comprises monitoring at least one of a backhaul packet delay between a radio access network and one or more of the plurality of base stations or an end-to-end packet delay between the radio access network and one or more users, and wherein modifying said at least one call admission control threshold comprises modifying said at least one call admission control threshold in response to at least one of the backhaul packet delay or the end-to-end packet delay exceeding a corresponding first threshold.

5. The method of claim 3, wherein monitoring said at least one of the packet delay or the packet loss rate comprises monitoring said at least one of the packet delay or the packet loss rate during a time window and detecting the mismatch when an average value of the packet delay or the packet loss rate over the time window exceeds the first threshold.

6. The method of claim 5, wherein the time window is longer than an hour.

7. The method of claim 3, wherein modifying said at least one call admission control threshold comprises modifying said at least one call admission control threshold to reduce the probability that a new flow is admitted when a detected mismatch indicates that the combined wireless access capacity exceeds the backhaul capacity.

8. The method of claim 3, wherein modifying said at least one call admission control threshold comprises modifying said at least one call admission control threshold to increase the probability that a new flow is admitted when a detected mismatch indicates that the combined wireless access capacity is less than the backhaul capacity.

9. The method of claim 1, wherein modifying the at least one call admission control threshold in response to the mismatch comprises modifying the at least one call admission control threshold in response to a change in number of the plurality of base stations that share the backhaul connection.

10. The method of claim 1, wherein modifying the at least one call admission control threshold in response to the mismatch comprises modifying the at least one call admission control threshold in response to a change in the backhaul capacity of the backhaul connection shared by the plurality of base stations.

11. A server in a wireless communication system, the server being configured to:
    modify at least one call admission control threshold provided to a plurality of base stations in response to a mismatch between a combined wireless access capacity of the plurality of base stations and a backhaul capacity of a backhaul connection; and
    provide said at least one modified call admission control threshold to the plurality of base stations.

12. The server of claim 11, wherein the server is configured to modify at least one of a first call admission control threshold used to determine whether to admit guaranteed bit rate users or a second call admission control threshold used to determine whether to admit best effort users.

13. The server of claim 11, wherein the server is configured to access information indicative of at least one of a packet delay or a packet loss rate for packets conveyed over the backhaul connection, and wherein the server is configured to modify said at least one call admission control threshold in response to at least one of the packet delay or the packet loss rate exceeding a first threshold.

14. The server of claim 13, wherein the server is configured to access information indicative of at least one of a backhaul packet delay between a radio access network and one or more of the plurality of base stations or an end-to-end packet delay between the radio access network and one or more users, and wherein the server is configured to modify said at least one call admission control threshold in response to at least one of the backhaul packet delay or the end-to-end packet delay exceeding a corresponding first threshold.

15. The server of claim 13, wherein the server is configured to access information indicative of an average value of said at least one of the packet delay or the packet loss rate over a time window, and the mismatch is detected when the average value of the packet delay or the packet loss rate over the time window exceeds the first threshold.

16. The server of claim 15, wherein the time window is longer than an hour.

17. The server of claim 13, wherein the server is configured to modify said at least one call admission control threshold to reduce the probability that a new flow is admitted when a detected mismatch indicates that the combined wireless access capacity exceeds the backhaul capacity.

18. The server of claim 13, wherein the server is configured to modify said at least one call admission control threshold to increase the probability that a new flow is admitted when a detected mismatch indicates that the combined wireless access capacity is less than the backhaul capacity.

19. The server of claim 11, wherein the mismatch is detected in response to at least one additional base station being deployed, wherein said at least one additional base station uses the backhaul capacity of the backhaul connection.

20. The server of claim 11, wherein the server is configured to modify the at least one call admission control threshold in response to a change in number of the plurality of base stations that share the backhaul connection.

21. The server of claim 11, wherein the server is configured to modify the at least one call admission control threshold in response to a change in the backhaul capacity of the backhaul connection shared by the plurality of base stations.

22. A network gateway configured to:
monitor at least one parameter indicative of relative values of a combined wireless access capacity of a plurality of base stations and a backhaul capacity of a backhaul connection shared by the plurality of base stations; and
notify a server in response to detecting a mismatch between the combined wireless access capacity and the backhaul capacity.

23. The network gateway of claim 22, wherein said at least one parameter comprises at least one of a packet delay or a packet loss rate for at least one packet conveyed over the backhaul connection.

24. The network gateway of claim 22, wherein said at least one parameter comprises at least one of a packet delay or a packet loss rate associated with at least one of a guaranteed bit rate user or a best effort user.

25. The network gateway of claim 22, wherein the network gateway is configured to detect the mismatch between the combined wireless access capacity and the backhaul capacity when said at least one parameter exceeds a threshold.

26. The network gateway of claim 25, wherein the network gateway is configured to monitor a backhaul packet delay between a radio access network and one or more of the plurality of base stations and notify the server when the backhaul packet delay exceeds the threshold.

27. The network gateway of claim 25, wherein the network gateway is configured to monitor or an end-to-end packet delay between a radio access network and one or more users, and wherein the network gateway is configured to notify the server when the end-to-end packet delay exceeds the threshold.

28. The network gateway of claim 25, wherein the network gateway is configured to monitor said at least one parameter over a time window, and wherein the network gateway is configured to detect the mismatch when an average value of said at least one parameter over the time window exceeds the threshold.

29. The network gateway of claim 28, wherein the time window is larger than or equal to an hour.

30. The network gateway of claim 22, wherein the network gateway is configured to notify the server in response to a change in the number of the plurality of base stations that share the backhaul connection.

31. The network gateway of claim 22, wherein the network gateway is configured to notify the server in response to a change in the backhaul capacity of the backhaul connection shared by the plurality of base stations.

* * * * *